US005666394A

United States Patent [19]
Swanson

[11] Patent Number: 5,666,394
[45] Date of Patent: Sep. 9, 1997

[54] THICKNESS MEASUREMENT GAUGE

[75] Inventor: Frank R. Swanson, deceased, late of Freeport, N.Y., by Patricia Swanson, executor

[73] Assignee: Northrop Grumman Corporation, Los Angeles, Calif.

[21] Appl. No.: 636,282

[22] Filed: Apr. 23, 1996

[51] Int. Cl.$^6$ .................................................. G01B 15/02
[52] U.S. Cl. ......................................... 378/89; 378/87
[58] Field of Search ............................... 378/44, 45, 50, 378/54, 57, 83, 86, 87, 88, 89, 76

[56] References Cited

U.S. PATENT DOCUMENTS

| | | | |
|---|---|---|---|
| 4,047,029 | 9/1977 | Allport | 250/273 |
| 4,803,715 | 2/1989 | Cho | 378/90 |
| 4,817,021 | 3/1989 | Sowerby et al. | 364/558 |
| 4,870,670 | 9/1989 | Geus | 378/87 |
| 5,068,883 | 11/1991 | DeHaan et al. | 378/86 |
| 5,115,751 | 5/1992 | Chotata et al. | 378/71 |
| 5,166,964 | 11/1992 | Hasegawa et al. | 378/89 |
| 5,195,116 | 3/1993 | Le Floc'h et al. | 378/86 |
| 5,331,163 | 7/1994 | Leahey et al. | 350/367 |
| 5,400,380 | 3/1995 | Gignoux et al. | 378/54 |

*Primary Examiner*—Don Wong
*Attorney, Agent, or Firm*—Terry J. Anderson; Karl J. Hoch, Jr.

[57] ABSTRACT

A thickness measurement gauge for measuring the thickness of an object. The gauge has a closed housing having a radiation-permeable housing floor. Within the housing are disposed (1) a radiation shield that houses a radiation source; (2) a radiation detector for detecting backscatter rays; and (3) a light sensor optically coupled to the radiation detector through a light guide also disposed within the housing. The shield has a collimation channel within which is the radiation source emitting gamma rays that exit the channel as a collimated beam. The light sensor converts light pulses from the radiation detector to electronic signals that are transmitted to an electronic readout device for conversion into a reportable thickness measurement. Measurement is accomplished by positioning the housing floor adjacent the surface of an object to be measured such that the gamma rays passing through the floor enter entry into the object. Resultant backscattered rays are detected by the radiation detector, ultimately resulting in correlation to known thickness values to thereby reveal the thickness of the measured object.

12 Claims, 1 Drawing Sheet ns THICKNESS MEASUREMENT GAUGE

BACKGROUND OF THE INVENTION

I. Field of the Invention

The present invention relates to a thickness measurement gauge having a radiation emission source and a backscatter radiation sensing capability to thereby measure the thickness of an object as a function of backscatter radiation magnitude.

II. Description of the Prior Art

Employment of radioactive source material for the measurement of the thickness of an object provides an accurate assessment of such thickness to thereafter enable an operator to use the data obtained for further processing of the measured object. Briefly, a thickness measurement is obtained by first directing radioactive particles into the object whose thickness is to be measured, and then detecting radiation that has passed through the object and/or is backscattered. The magnitude of detected radiation is correlated with previously determined data that relates such radiation magnitude to material thickness and is specific to the type of material being measured.

Prior art equipment includes separate gamma ray emitters and gamma ray detectors. Methodology employing this equipment includes either placing an emitter at one surface of an object and a detector at the opposite surface for collecting radiation that has passed through the object, or placing a separate emitter and a separate detector at the same surface for collecting backscatter radiation. In either event, an operator is required to use two pieces of equipment to accomplish thickness measurement.

In view of the burdensome nature of the requirement to use, minimally, two devices for the emission and measurement of radiation, it is apparent that a need is present for a compact apparatus capable of efficiently performing thickness measurements. Accordingly, a primary object of the present invention is to provide a thickness measurement gauge having a single housing containing both gamma ray emission capability and backscatter detection capability.

Another object of the present invention is to provide a thickness measurement gauge having a radiation shield with a collimated channel in which is housed a radiation source emitting gamma rays that exit as a collimated beam for direction toward an object whose thickness is to be measured.

Yet another object of the present invention is to provide methodology for employing a thickness measurement gauge as here described in a procedure for measuring the thickness of an object.

These and other objects of the present invention will become apparent throughout the description thereof which now follows.

SUMMARY OF THE INVENTION

The present invention is a thickness measurement gauge for measuring the thickness of an object. The gauge comprises a closed housing having a radiation-permeable housing floor having a top surface within the housing and a bottom surface outside the housing. Within the housing are disposed (1) a radiation shield that houses a radiation source; (2) a radiation detector for detecting backscatter rays; and (3) a light sensor optically coupled to the radiation detector through a light guide also disposed within the housing. The shield has a collimation channel with an open distal end situated to substantially terminate at the top surface of the housing floor. Disposed within the collimation channel is the radiation source emitting gamma rays that exit the open distal end of the collimation channel as a collimated beam. The light sensor converts light pulses from the radiation detector to electronic signals that are transmitted to an electronic readout device for conversion into a reportable radiation measurement correlated to a thickness of an object being measured.

Methodology for measuring the thickness of an object includes positioning the bottom surface of the housing floor adjacent to a surface of an object to be measured such that the collimated beam of gamma rays passing through the floor is positioned for entry into the object. Resultant backscattered rays passing through the floor into the closed housing are detected by the radiation detector, resulting in light pulses being transmitted to the light sensor for conversion to electronic signals transmitted to the electronic readout device and converted to a reportable radiation measurement. Values of measured backscatter rays are individually unique to both thickness and construction of the object being measured. Such values have been predetermined, and the measured backscatter ray value is correlated to such known values to thereby reveal the thickness of the measured object. In this manner, the gauge of the present invention provides a device and methodology for measurement of the thickness of an object without requiring a plurality of individual equipment members being positioned at a plurality of different sites. Instead, the present invention is a one-piece device positioned at a single site of an object to thereby achieve an accurate thickness determination.

BRIEF DESCRIPTION OF THE DRAWINGS

An illustrative and presently preferred embodiment of the invention incorporates apparatus shown in the accompanying drawings in which.

DETAILED DESCRIPTION OF THE PREFERRED EMBODIMENT

The present invention is a thickness measurement gauge employable in the determination of thicknesses of objects in accord with backscatter radiation values uniquely associated with particular thicknesses of respectively particular materials.

Figure 1:
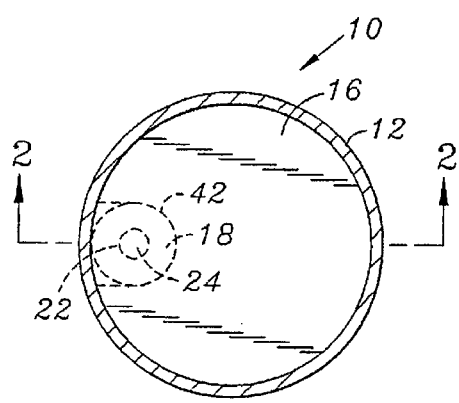
FIG. 1 is a schematic bottom plan view of a thickness measurement gauge.
Figure 2:
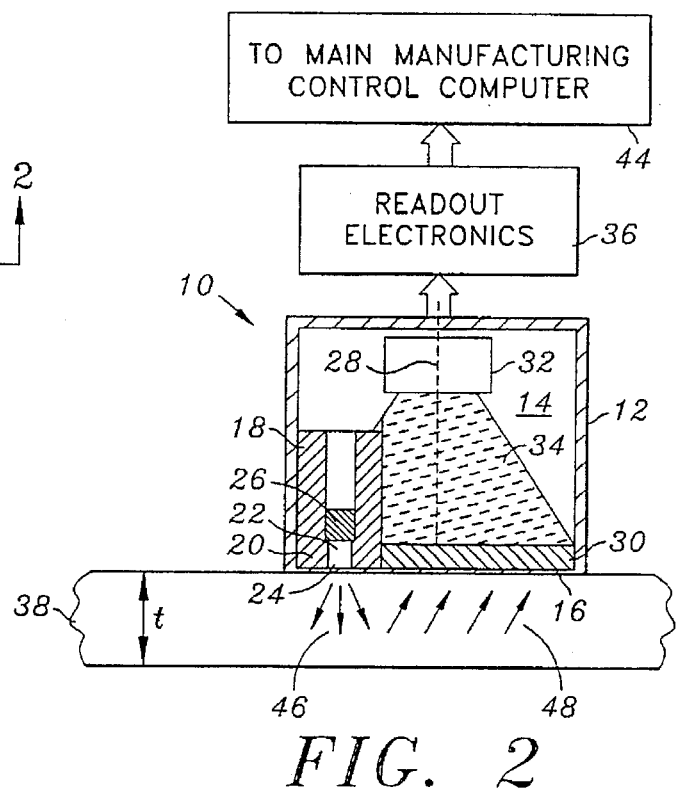
FIG. 2 is a schematic elevation view in section along line 2—2 of FIG. 1.

Referring to FIGS. 1 and 2, a thickness measurement gauge 10 is illustrated. The gauge 10 comprises a closed cylindrical housing 12 having an open interior 14 and a radiation-permeable housing floor 16. A non-limiting example of floor construction through which gamma radiation readily passes is aluminum having a thickness of about 0.010 inch. Disposed within the housing 12 is a radiation shield 18 situated parallel to and off-set from the central axis 28 of the housing 12. The shield 18 has a distal end 20 and a collimation channel 22 with an open distal end 24 situated to substantially terminate at the top surface of the housing floor 16. Situated within the channel 22 is a gamma-ray radiation source 26. The source in the presently described embodiment is cobalt-57, but, of course, can be any appropriate isotope capable of emitting radioactive particles and having standard backscatter values associated with thicknesses and types of material. Preferably, however, the isotope should be limited to one of low radioactivity so that health hazards and special handling requirements are minimal. One such radiation source is a BFIM Series point source available from Isotope Products Laboratories, Burbank, Calif. The shield 18 is here constructed of tungsten because of the energy level of cobalt-57. For source energies less than about 80 keV (e.g. Am-241), the shield 18 can be constructed of lead.

A radiation detector 30 is disposed adjacent the distal end 20 of the radiation shield 18 and immediately above the top surface of the housing floor 16. In the embodiment here shown the radiation detector 30 is crystalline cesium iodide having a thickness of about 1/8 inch. The detector 30 and distal end 20 of the radiation shield 18 together occupy substantially all of the area immediately above the top surface of the housing floor 16. Axially proximal to the detector 30 within the interior 14 of the housing 12 is a light sensor 32, non-limitedly exemplified by a photomultiplier tube or a photodiode, that converts light pulses produced by the detector 30 to electronic signals. One such sensor is a Hamamatsu Photonics Type R5600 miniature photomultiplier. The light sensor 32 is optically coupled to the detector 30 through a reducing light guide 34, which can be constructed of lucite or other light-transmitting material, whose function is to direct light pulses from the detector 30 to the sensor 32. The electronic signals originating from the light sensor 32 are transmitted to an electronic readout device 36 providing signal amplification (pre-amplifier and amplifier stages) and signal-level discrimination that furnish digital pulses for count-rate measuring circuitry. This count-rate measurement is compared to previously measured standard thicknesses and the thickness of the unknown specimen is established. Finally, and depending upon user needs, data generated by the electronic readout device 36 can be conventionally transmitted to a control computer 44 for subsequent analysis, storage, or the like.

Operation of the gauge 10 is illustrated in FIG. 2. As there shown, the gauge 10 is positioned with respect to an object 38 whose thickness (t) is to be measured such that the bottom surface of the housing floor 16 is adjacent the surface 40 of the object 38. Such placement positions the radiation detector 30 and distal end 20 of the shield 18 close to the surface 40 of the object 38 to be measured. As earlier described, the radiation source 26 resides within the collimation channel 22 such that a collimated beam of gamma rays designated as 46 exit the distal open end 24 of the shield 18 and pass through the housing floor 16. Formation of a collimated beam requires that the channel 22 be properly sized with respect to length and diameter. Size of the collimation channel 22 within the shield 18 here defined is about 1/16 inch long and about 1/16 inch in diameter, a geometry providing effective beam collimation. In addition to generating a collimated beam of radioactive particles, the shield 18 also protects the radiation detector 30 from the radiation field of the radiation source 26. By locating the distal end 20 of the shield 18 within a cut-out portion 42 (shown in FIG. 1) of the radiation detector 30 parallel with and away from the central axis 28 of the housing 12, the onset of saturation in the measurement-response is dampened, and thus improves depth-range measurement capability.

Measurement of the thickness of an object 38 begins when the collimated beam of gamma rays 46 is positioned for entry into the object. Some of the incident gamma rays are scattered (via the Compton effect) in a generally backward direction as backscattered rays designated as 48 and are intercepted by the radiation detector 30 as they pass through the housing floor 16. These backscattered rays 48 result in light pulses that are transmitted via the reducing light guide 34 to the light sensor 32 for conversion to electronic signals thereafter transmitted to the electronic readout device 36 and converted to a reportable measurement of the thickness of the object 38 being measured. The amount of backscatter detected increases with the thickness of the object being measured, until a sufficient thickness is reached to produce a saturation of the signal.

Figure 3:
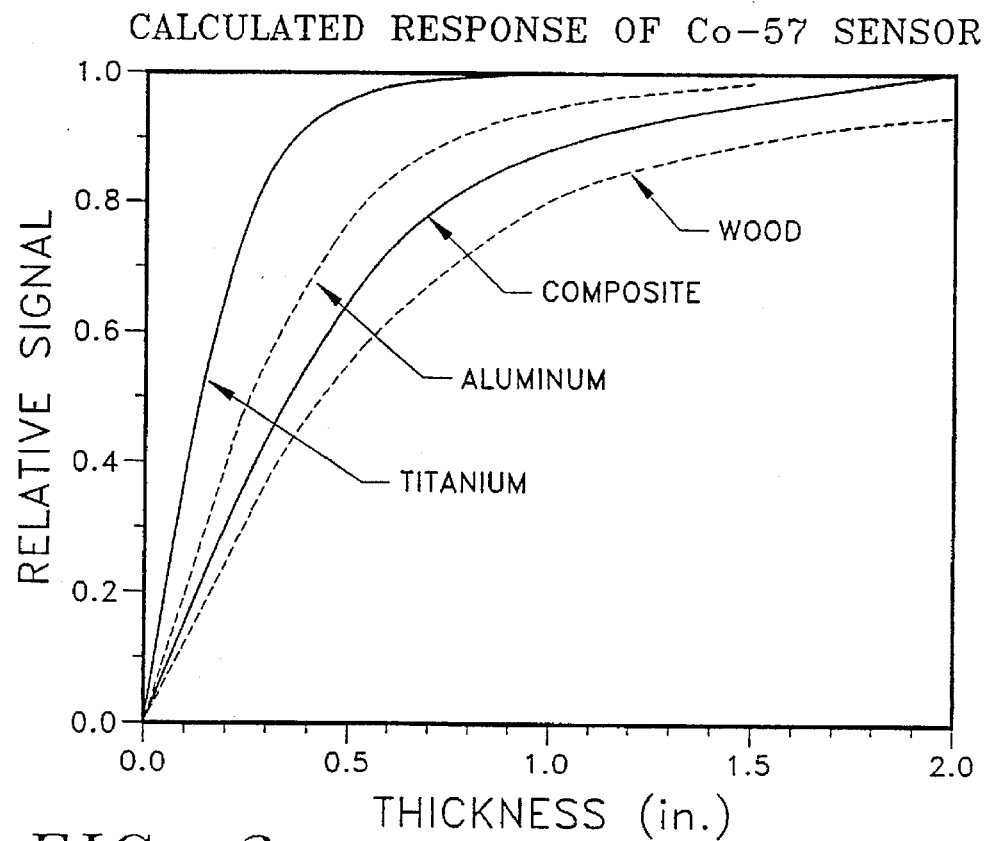
FIG. 3 is a graph correlating the thickness and radiation values of various materials.

Reportability of the thickness of an object being measured is accomplished by comparing present backscatter results with known backscatter results for types and thicknesses of materials. Preferably, such comparisons are accomplished by a microprocessor of the electronic readout device 36. In particular, the signals from the light sensor 32 contain both pulse height and count rate information. The readout device 36 accepts only those pulse heights corresponding to the energy of the backscattered gamma rays and then converts the accepted signal pulses into count-rate values by using timed digital counters. Such amplitude and pulse-rate data is converted to thickness values by comparing programmed thickness values for known thicknesses and types of materials with the information gathered for a presently measured object. FIG. 3 exemplifies such stored comparison data. In particular, the graph of FIG. 3 shows the relative signal expected from gauge 10 for different thicknesses of titanium, aluminum, composite (carbon fiber-reinforced epoxy resin) and wood. The data for the curves were computed with a radiation transport code employing detailed modeling of the sensor geometry, and indicate the effective depth range of the modelled sensor for the materials measured, including about 3/8 inch for titanium and over 1.5 inch for wood. The microprocessor stores a range of such information in a calibration mode, and employs an algorithm to convert count-rate readings to thickness values. The gauge 10 thereby permits an operator to determine the thickness of an object at the site of the object, whether that site be within a manufacturing facility or at a remote location.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A thickness measurement gauge comprising:

a) a closed housing having a radiation-permeable floor having a top surface within the housing and a bottom surface outside the housing;

b) a radiation shield disposed within the interior of the housing, the shield having a distal end and a collimation channel with an open distal end situated to substantially terminate at the top surface of the housing floor;

c) a radiation source disposed within the collimation channel of the housing and emitting gamma rays, said gamma rays exiting as a collimated beam thereof from the open distal end of the collimation channel;

d) a radiation detector disposed within the housing for detecting backscatter rays;

e) a light sensor disposed within the housing and optically coupled to the radiation detector through a reducing light guide disposed within the housing, the light sensor being able to convert light pulses produced by the radiation detector to electronic signals; and f) an electronic readout device in communication with the light sensor and able to convert the electronic signals produced by the light sensor into a reportable radiation measurement correlated to a thickness of an object being measured.

2. A thickness measurement gauge as claimed in claim 1 wherein the radiation shield is substantially parallel with and offset from a vertical central axis of the interior of the housing, and wherein the radiation detector is situated adjacent the distal end of the radiation shield and immediately above the top surface of the housing floor such that the radiation detector and the distal end of the radiation shield together occupy substantially all of an area immediately above the top surface of the housing floor.

3. A thickness measurement gauge as claimed in claim 2 wherein the collimation channel of the radiation shield has a length of about 1/16 inch and a diameter of about 1/16 inch.

4. A thickness measurement gauge as claimed in claim 1 wherein the housing is substantially cylindrical.

5. A thickness measurement gauge as claimed in claim 4 wherein the radiation shield is substantially parallel with and offset from a vertical central axis of the interior of the housing, and wherein the radiation detector is situated adjacent the distal end of the radiation shield and immediately above the top surface of the housing floor such that the radiation detector and the distal end of the radiation shield together occupy substantially all of an area immediately above the top surface of the housing floor.

6. A thickness measurement gauge as claimed in claim 5 wherein the collimation channel of the radiation shield has a length of about 1/16 inch and a diameter of about 1/16 inch.

7. A method for measuring the thickness of an object, the method comprising:

a) forming a closed housing having a radiation-permeable floor having a top surface within the housing and a bottom surface outside the housing;

b) disposing a radiation shield within the housing, the shield having a distal end and a collimation channel with an open distal end situated to substantially terminate at the top surface of the housing floor;

c) disposing a radiation source within the collimation channel of the housing to thereby emit gamma rays, said gamma rays exiting as a collimated beam thereof from the open distal end of the collimation channel;

d) disposing a radiation detector within the housing for detecting backscatter rays;

e) disposing a light sensor within the housing and optically coupling the light sensor to the radiation detector through a reducing light guide disposed within the housing, said light sensor being able to convert light pulses produced by the radiation detector to electronic signals;

f) connecting an electronic readout device to the light sensor for converting the electronic signals produced by the light sensor into a reportable radiation measurement correlated to a thickness of an object being measured;

g) positioning the bottom surface of the housing floor adjacent to a surface of the object such that the collimated beam of gamma rays is positioned for entry into the object;

h) detecting resultant backscatter rays and transmitting resulting light pulses to the light sensor;

i) converting the light pulses to electronic signals and transmitting said signals to the electronic readout device; and j) converting the signals to a reportable measurement of the thickness of the object being measured.

8. A method for measuring the thickness of an object as claimed in claim 7 wherein the radiation shield is substantially parallel with and offset from a vertical central axis of the interior of the housing, and wherein the radiation detector is situated adjacent the distal end of the radiation shield and immediately above the top surface of the housing floor such that the radiation detector and the distal end of the radiation shield together occupy substantially all of an area immediately above the top surface of the housing floor.

9. A method for measuring the thickness of an object as claimed in claim 8 wherein the collimation channel of the radiation shield has a length of about 1/16 inch and a diameter of about 1/16 inch.

10. A method for measuring the thickness of an object as claimed in claim 9 wherein the housing is substantially cylindrical.

11. A method for measuring the thickness of an object as claimed in claim 10 wherein the radiation shield is substantially parallel with and offset from a vertical central axis of the interior of the housing, and wherein the radiation detector is situated adjacent the distal end of the radiation shield and immediately above the top surface of the housing floor such that the radiation detector and the distal end of the radiation shield together occupy substantially all of an area immediately above the top surface of the housing floor.

12. A method for measuring the thickness of an object as claimed in claim 11 wherein the collimation channel of the radiation shield has a length of about 1/16 inch and a diameter of about 1/16 inch.

* * * * *